Feb. 6, 1973  E. J. RYAN  3,715,430

PURIFIED OXYGEN GAS CONTAINING OZONE AND HIGHER OXYGEN POLYMERS

Original Filed March 11, 1955

United States Patent Office 3,715,430
Patented Feb. 6, 1973

3,715,430
PURIFIED OXYGEN GAS CONTAINING OZONE
AND HIGHER OXYGEN POLYMERS
Edmond J. Ryan, 2322 SW. 13th St., Miami, Fla.
Continuation of application Ser. No. 438,793, Mar. 10, 1965, which is a division of application Ser. No. 26,376, May 2, 1960, both now abandoned, which in turn is a division of application Ser. No. 493,656, Mar. 11, 1955, now Patent No. 2,937,983, and a continuation-in-part of application Ser. No. 762,199, Sept. 17, 1958, now Patent No. 3,063,904. This application Aug. 4, 1969, Ser. No. 849,588
Int. Cl. A61k 27/00
U.S. Cl. 424—127    1 Claim

ABSTRACT OF THE DISCLOSURE

A therapeutically active oxygen gas consisting of oxygen purified of its normal contaminants such as moisture and carbon dioxide as well as any contaminating components that may be derived from ultra-violet light generating apparatus, the purified oxygen gas being exposed to ultra-violet light in a narrow wave length sufficient to generate about 5 to 500 parts per million of ozone and higher polymeric forms of oxygen.

---

Figure 2:
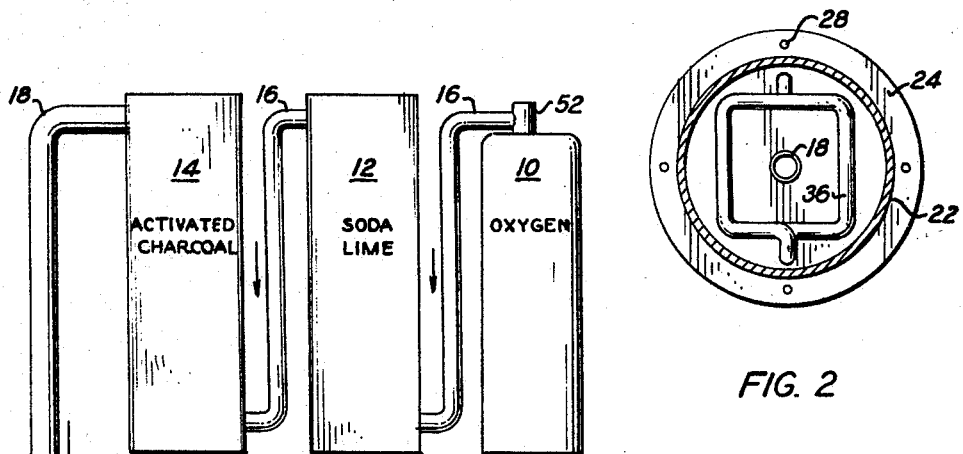

This application is a continuation of my copending application, Ser. No. 438,793, filed Mar. 10, 1965, and now abandoned, in turn a division of my co-pending application Ser. No. 26,376, filed May 2, 1960, now abandoned, in turn a division of application Ser. No. 493,656, filed Mar. 11, 1955, now Pat. No. 2,937,983, granted May 24, 1960, and also a continuation-in-part of application Ser. No. 762,199, filed Sept. 17, 1958, now Pat. No. 3,063,904, and the invention relates to production of ozone and higher oxygen polymers to a controlled content in oxygen. More particularly, the invention provides a method and apparatus for producing substantially pure oxygen with a controlled content of ozone and higher oxygen polymers for therapeutic use, most usually preferred in the range of 5 to 100 p.p.m. or higher when desired such as up to 500 p.p.m. If necessary, for specific cases, where the gas is to be applied externally, higher concentrations may be used.

Ordinary ozone as normally produced, usually in air but sometimes in oxygen, is quite unstable. The ozone content usually varies between about 1 and 2% by volume both as produced with variable quantities of moisture in the oxygen-containing gas being ozonized, and as produced with other impurities usually associated with such gas having a catalytic effect to reduce the content of the unstable ozone component therein, and with conditions and period of storage.

A substantial source of contamination which catalyzes the breaking down of the unstable ozone molecule is metal oxides, most usually copper oxide, picked up from apparatus (electrical) with which the gas usually comes in contact in production, or metal oxides from containers for the initial oxygen supply or storage of the ozone-containing gas.

While efforts have been suggested in the past to use ozone therapeutically, it has never been found to be effective in such therapeutic uses as inhalation of the gas or direct injection intraveneously because ozone was commonly accepted as being toxic or irritating to the body tissues. I have found that this is due in part to toxic and irritating impurities with which ozone as heretofore commercially produced was contaminated, and in part to lack of adequate control to produce a therapeutically useful dosage level of ozone in oxygen.

More specifically, according to the present invention, I have found that it is possible to use ozone-containing oxygen for many therapeutic applications provided that the gas, free of such impurities, is produced with a carefully controlled ozone and polymeric oxygen content so that a substantially exact concentration and quantity of ozone introduced into the human body is controlled at will.

It is accordingly a primary object of the present invention to convert oxygen gas to a substantially pure oxygen gas with a controlled ozone and polymeric oxygen content from about 5 to 100 parts per million or higher as needed, such as up to 500 p.p.m. directly useful as needed for therapeutic purposes. It is a second object of this invention to provide apparatus flexibly controlled to produce an oxygen gas with a desired ozone and polymeric oxygen content in this range.

Further objects are inherent in the description of the drawings wherein

Figure 1:
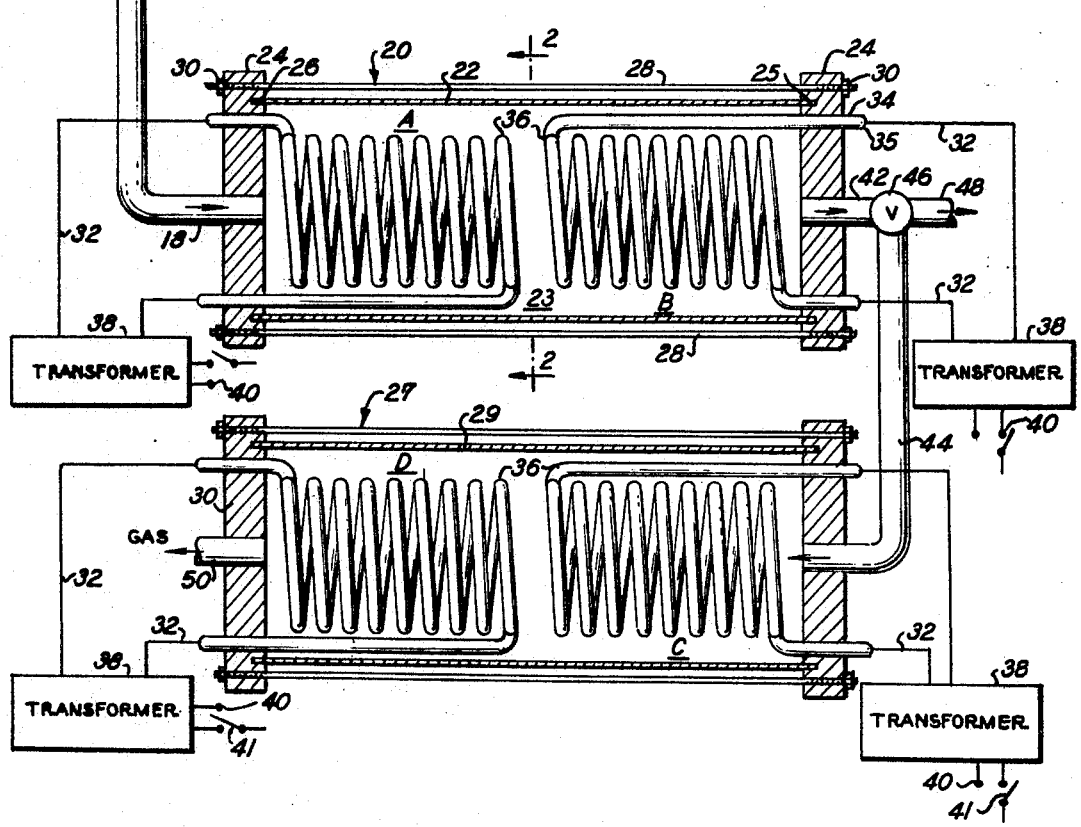

FIG. 1 illustrates purifying columns associated with a series of ozone and polymeric oxygen reactors, self contained as a single apparatus unit, in which the reactors are in longitudinal section to show internal construction; and FIG. 2 is a radical section through one of the reactors taken on the line 2—2 of FIG. 1.

A source of oxygen gas in a container 10 is provided which will contain oxygen of as good quality as commercially available, such as 98% oxygen together with such removable impurities as traces of moisture and carbon dioxide. The gas is passed through purifying columns 12 and 14 in a series by way of ducts 16 containing fragments of soda lime, and active charcoal (carbon) respectively, each together with fibrous packing as conventional in a gas purification column to remove gaseous as well as solid impurities and prevent any carry-over of solid dust particles. Such purification produces an oxygen gas of approximately 99% pure $O_2$. The purified oxygen gas passes through a duct 18 to a first reactor 20 comprising an ultra violet light chamber 23.

The reactor 20 comprises a cylindrical housing tube 22 of non-metallic substance such as hard, heat-stable and oxygen-resistant plastic, for example hard Bakelite (phenol-formaldehyde condensation) plastic enclosing the chamber 23. The tube 22 is mounted to end seals, comprising plates 24 and 26 which may be composed of similar non-metallic substance but which may be either of similar plastic, such as Bakelite, and sealed thereto through circular grooves 25 in gas tight fit using a plastic adhesive such as a solvent soluble form of Bakelite set in the seal with heat, after applying in liquid form. The end pieces, 24 and 26, are further tightly secured to the tube 22 by bracing rods 28 which extend from the end piece 26 to the end piece 24 and are bolted at 30 for tight securement under pressure to the tube 22.

The tube 22 has mounted, cooperative with each respective end, two ultra violet light "burners" A and B each of which comprises a coil 36 of fused quartz tubing having electrical lead wires 32 fused in each end 34 of the tube 36. Each lead wire in the tube end is preferably surrounded by a globule of mercury 35 for improved electrically conductive contact with the interior of the quartz tube 36. Each quartz tube 36 is filled and sealed at its ends 34 with a blend of inert gases argon and krypton adjusted in proportion and pressure whereby the argon is under a pressure of about 8 millimeters and the krypton is under a pressure of about 1.5 millimeters Hg. In that adjusted proportion, the gas spectrum when electrically energized to a light emissive state will give approximately the wave length of the mercury itself. Moreover, in the electrically excited state the gases will emit ultra violet in the specific wave length of approximately 2485 to 2537 angstrom units which is optimum both to destroy bacteria as well as to produce a specific quantity of ozone and polymeric oxygen in the oxygen exposed thereto under conditions herein specified.

To provide a controlled surface area of quartz tube emission of ultra violet light in said wave length range, whereby to produce approximately 3 to 25 per million of ozone and polymeric oxygen in the oxygen gas per burner by the ultra violet light exposure at atmospheric pressure of oxygen gas passing over the light emitting surface of the quartz tube, the quartz tube used is ¼ inch tubing and is coiled in a square configuration about 3" on a diagonal, as shown in FIG. 2, from approximately a six foot length (prior to coiling) of the quartz tubing. Thus the quartz tube coils 36 in each section A, B, C and D, etc. have duplicate ultra violet light emitting capacity and consequently have duplicate ozone and polymeric oxygen generating capacity.

Each lead wire 32 communicating with the ends 34 of the burner coils 36 as described, lead to respective transformers 38 supplying a secondary voltage in the range of 3,000 to 10,000 volts usually operating at 5,000 volts, from a primary input of 110 volts A.C. supplied to the leads 40. Each lead 40 has a switch 42 whereby any one or more of the several ultra violet light burners A, B, C or D may be electrically energized as desired.

As shown in FIG. 1 there are two reactors 20 and 27 comprising the Bakelite tubes 22 and 29 interconnected for passage of the partially ozonized gas from the first tube to the second tube 29 through the duct 44. Thus several reactors with tubes 22 and 29, each having a pair of burners mounted therein, may be operated in series for irradiation of oxygen gas by any desired number of standardized quartz ultra violet light emitters whereby the gas is treated serially with from 1 to 4 burner units A, B, C and D to increase the ozone and higher oxygen polymer concentration serially in specific increments as desired. A three-way valve 46 is mounted between the outlet 42 and inlet 44 so that gas may be taken off of duct 42 for use at that point if desired through outlet 48; or the ozone- and polymeric oxygen-containing oxygen gas may be ultimately taken off through an outlet 50 after additional ozone and polymeric oxygen generation in the second reactor unit 27 as desired. Obviously, although the figure shows two such units 20 and 27, which are variably controlled to impart an ozone and higher oxygen polymer content of 5 to 100 p.p.m. to the oxygen, there may be any additional number similarly mounted serially to further increase the ozone and higher oxygen polymer concentration to a higher limit such as up to 500 p.p.m. for therapeutic use.

As shown in FIG. 1 the reactor 20 also may have mounted therein barrier layers of soda-lime 15 and active carbon 17 so that for ultimate simplification, where only one reactor is used, the preliminary charcoal and soda-lime towers 12 and 14 may be omitted. Alternatively, the soda-lime and carbon layers in the tube 22 may be omitted when their function is adequately performed by the towers 12 and 14, and as shown in the omission of these materials in reactor 29, such duplication is unnecessary. When these gas purifying substances are placed in the tube 22, they are further held by fibrous glass wool packing 19 to prevent entrainment of dust.

In operation as the apparatus is thus described, the first burner A in reactor 20, when activated, will produce about 3 to 25 parts per million of ozone and polymeric oxygen gas in pure oxygen supplied thereto through duct 18 variable with the oxygen pressure and flow rate. If the desired concentration is obtainable with the single burner, the second burner B therein will be left inactivated and the gas produced in this operation containing about 3 to 25 parts per million of ozone and polymeric oxygen, will be taken of that outlet 48 for immediate therapeutic use. Where the gas is desired to have an increased ozone and polymeric oxygen content such as 10 to 50 parts per million, then the burner B is activated and the gas again taken off at outlet 48. For an additional increment such as a 15 to 75 parts per million ozone and polymeric oxygen content, the gas is passed through the second reactor unit 27 with the burner C activated; or for a fourth increment, with both C and D burners activated, the gas containing 20 to 100 parts per million ozone and polymeric oxygen is taken off at 50, or may be further treated serially with additional reactors not shown to produce the desired ozone and polymeric oxygen content in the gas.

Increasing the pressure of the oxygen passed through the unit results in a substantially increased ozone and polymeric oxygen content, and as designed, each reactor unit will tolerate up to 500 lbs. pressure. That treatment at increased pressure gives an additional variable control in ozone and polymeric oxygen content by use of higher pressures, controlled by a variable pressure reducing valve 52 of standard construction mounted at the outlet of the oxygen container 10 to supply whatever oxygen pressure is desired. Some further variation of ozone and higher oxygen polymer content is available by temperature variation by heating or cooling the gas passing through line 18 by any conventional means not shown, but such is generally unnecessary inasmuch as some temperature variation will result from variation of the flow rate upon rapid or slow release of oxygen from confinement in the pressure resistant container 10 in which the oxygen is stored.

An additional control of the quantity of ozone and polymeric oxygen produced in the gas is in the flow rate of gas passed through the apparatus. Normally in the dimensions given, from 1 to 5 liters of gas per minute may be passed through the device at a pressure from atmospheric to 500 lbs. per square inch. A typical operation may consist of about two liters of gas per minute passed through the apparatus at a pressure of about 50 lbs. per square inch to provide from a single burner unit an ozone-containing oxygen gas of about 3 to 15 parts per million.

The following table illustrates the composition of the gas with variation in the number of burners operating, the flow rate and pressure of $O_2$ being treated.

| Burner, p.p.m. | 1 | 2 | 3 | 4 |
|---|---|---|---|---|
| Conditions: | | | | |
| Atmospheric pressure, 2 liter per minute flow | 2.5 | 5.0 | 7.5 | 10 |
| 50 p.s.i., 1 liter per minute | 15 | 30 | 45 | 60 |
| 100 p.s.i., 1 liter per minute | 25 | 50 | 75 | 100 |
| Atmospheric, 1 liter per minute | 4 | 8 | 12 | 16 |
| 50 p.s.i., 2 liter per minute | 10 | 20 | 30 | 40 |
| 100 p.s.i., 2 liter per minute | 20 | 40 | 60 | 80 |

A substantial advantage of operating in the critical wave length is that the oxygen gas purified of carbon dioxide and moisture in the soda-lime and activated charcoal columns becomes sterilized to destroy the micro-organic materials with which the gas may be contaminated for optimum therapeutic use.

The entire apparatus described is small; the container 10 can carry an adequate supply of oxygen for local therapeutic uses, so that all of the elements of this apparatus are readily packaged for portability to the site of use.

As produced in this manner the gas is non-irritating to the human body and may be intravenously injected into the blood stream with substantial therapeutic effect. The device being portable and readily controlled by a physician as to any desired specific ozone and polymeric oxygen concentration, allows immediate application to the patient according to his spot judgment as to the specific dosage to be applied.

As shown in my prior patents, ozonized oxygen is highly useful therapeutically.

I claim:

1. A gas composition consisting essentially of about 99% pure oxygen substantially purified by the reduction of moisture and carbon dioxide, said purified oxygen gas being exposed to ultraviolet light in a wave length of about 2485 to 2537 angstrom units sufficient to impart to said purified oxygen 5 to 500 parts per million of ozone and higher oxygen polymers.

References Cited

Pribluda: Chem. Abst., vol. 32 (1938), page 2625.

Vosmaer, Ozone: Its Manufacture and Uses (1916), Van Nostrand Co., N.Y., pages 171–173.

U.S. Dispensatory, 23rd edit. (1943), pages 810–812, 1466.

U.S. Dispensatory, 25th edit. (1947), pages 948–950.

Merck Index, 7th edit. (1960), page 764.

SAM ROSEN, Primary Examiner